(12) United States Patent
Sue et al.

(10) Patent No.: US 12,725,914 B2
(45) Date of Patent: Sep. 1, 2026

(54) ANTENNA DEVICE

(71) Applicant: AISIN CORPORATION, Kariya (JP)

(72) Inventors: Yoshikuni Sue, Kariya (JP); Takehiro Tabata, Kariya (JP); Eiji Koide, Kariya (JP); Masahiro Sugiyama, Kariya (JP)

(73) Assignee: AISIN CORPORATION, Kariya (JP)

( * ) Notice: Subject to any disclaimer, the term of this patent is extended or adjusted under 35 U.S.C. 154(b) by 94 days.

(21) Appl. No.: 18/441,016

(22) Filed: Feb. 14, 2024

(65) Prior Publication Data

US 2024/0322423 A1 Sep. 26, 2024

(30) Foreign Application Priority Data

Mar. 22, 2023 (JP) ................................ 2023-045676

(51) Int. Cl.

*H01Q 1/32* (2006.01)
*G01D 5/24* (2006.01)
*H01Q 21/28* (2006.01)

(52) U.S. Cl.

CPC ............. *H01Q 1/3291* (2013.01); *G01D 5/24* (2013.01); *H01Q 21/28* (2013.01)

(58) Field of Classification Search

CPC .... H01Q 1/3291; H01Q 21/28; H01Q 1/3283; H01Q 1/3241; H01Q 1/42; H01Q 1/50; H01Q 1/52; H01Q 1/521; H01Q 21/30; G01D 5/24; E05B 81/76–78

See application file for complete search history.

(56) References Cited

U.S. PATENT DOCUMENTS

2012/0133159 A1* 5/2012 Tateishi .................. E05B 81/77 292/336.3
2023/0365102 A1 11/2023 Yamamoto et al.

FOREIGN PATENT DOCUMENTS

JP 2001345615 A * 12/2001 ............... H01Q 7/08
JP 2008079118 A * 4/2008 ........... H01Q 1/3283
JP 2019-62372 A 4/2019
JP 2022-115132 A 8/2022

* cited by examiner

*Primary Examiner* — Dimary S Lopez Cruz
*Assistant Examiner* — Austin M Back
(74) *Attorney, Agent, or Firm* — Oblon, McClelland, Maier & Neustadt, L.L.P.

(57) ABSTRACT

Provided is an antenna device that has a smaller size and facilitates wire arrangement. The antenna device provided inside a door handle of a vehicle includes a first antenna, a second antenna, a receiver, and an inner case. The first antenna is provided at a grip portion of the door handle, and transmits a radio wave in a first frequency band. The second antenna receives a radio wave in a second frequency band higher than the first frequency band. The receiver processes a signal based on the radio wave received by the second antenna. The inner case accommodates the second antenna and the receiver inside the door handle. In the inner case, the first antenna and the second antenna are arranged along a longitudinal direction of the door handle.

7 Claims, 3 Drawing Sheets

ANTENNA DEVICE

CROSS REFERENCE TO RELATED APPLICATIONS

This application is based on and claims priority under 35 U.S.C. § 119 to Japanese Patent Application 2023-045676, filed on Mar. 22, 2023, the entire content of which is incorporated herein by reference.

TECHNICAL FIELD

This disclosure generally relates to an antenna device provided inside a door handle of a vehicle.

BACKGROUND DISCUSSION

Conventionally, electronic key systems have been used in vehicles. Techniques related to such electronic key systems include those described in JP2022-115132A (Reference 1) and JP2019-62372A (Reference 2), for example.

Reference 1 describes an electronic key system. This electronic key system is installed in a vehicle, and performs wireless communication with a portable device by using low frequency (LF) wireless communication and Bluetooth low energy (BLE ("Bluetooth" is a registered trademark)) communication. An LF antenna used for LF wireless communication is arranged inside a door or between a driver seat and a passenger seat, and a BLE antenna is arranged inside a pillar on a side of the driver seat.

Reference 2 describes a composite antenna device to be used in a vehicle electronic key system. This composite antenna device includes a first antenna that transmits a radio wave in an LF band, and a second antenna that transmits a radio wave in an ultra-high frequency (UHF) band. The composite antenna device is accommodated inside a door handle of a vehicle, and the second antenna is arranged in a lateral-side area where a magnetic flux generated from the first antenna is sparse.

Since the LF antenna and the BLE antenna described in Reference 1 are accommodated in cases separate from each other, the respective arrangement spaces need to be taken into account. A wire for each of the LF antenna and the BLE antenna needs to be drawn and arranged, and a plurality of harnesses are required. This causes an increase in cost. According to the antenna device described in Reference 2, an on-vehicle device that controls the first antenna and an ECU that controls the second antenna are provided outside the door handle, and thus, a size of an entire system is larger.

A need thus exists for an antenna device, which is not susceptible to the drawback mentioned above.

SUMMARY

An antenna device according to an aspect of this disclosure includes a first antenna, a second antenna, a receiver, and an inner case. The first antenna is provided at a grip portion of a door handle and transmits a radio wave in a first frequency band. The second antenna receives a radio wave in a second frequency band higher than the first frequency band. The receiver processes a signal based on the radio wave received by the second antenna. The inner case accommodates the second antenna and the receiver inside the door handle. In the inner case, the first antenna and the second antenna are arranged along a longitudinal direction of the door handle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

An antenna device according to this disclosure is configured in such a way as to be small-sized and facilitate wire arrangement. The following describes the antenna device 1 according to the present embodiment. However, various modifications can be made without being limited to the following embodiments, within a range that does not depart from the essence.

Figure 1:
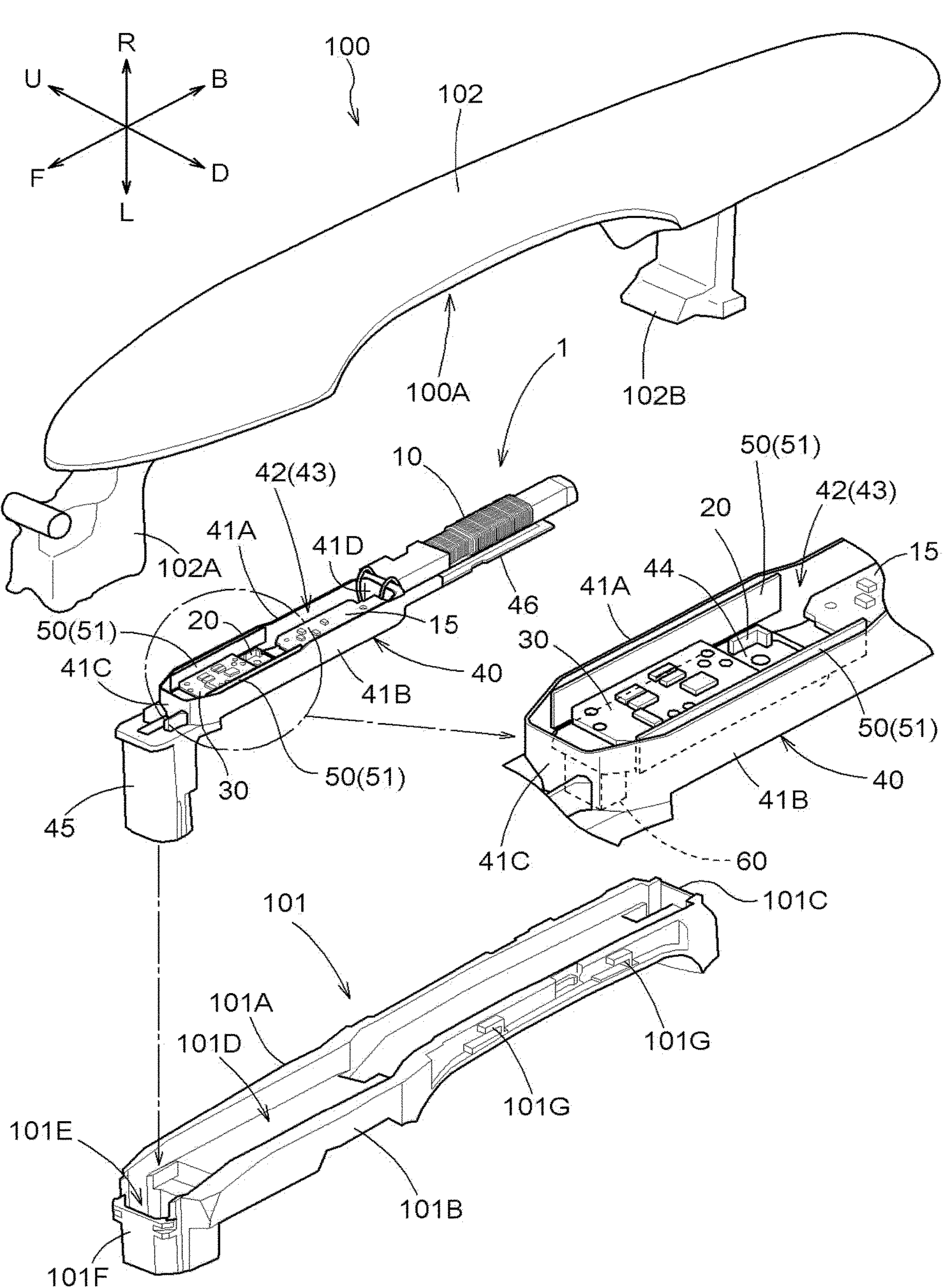
FIG. 1 is an exploded perspective view of a door handle in which an antenna device according to a first embodiment is provided.
Figure 2:
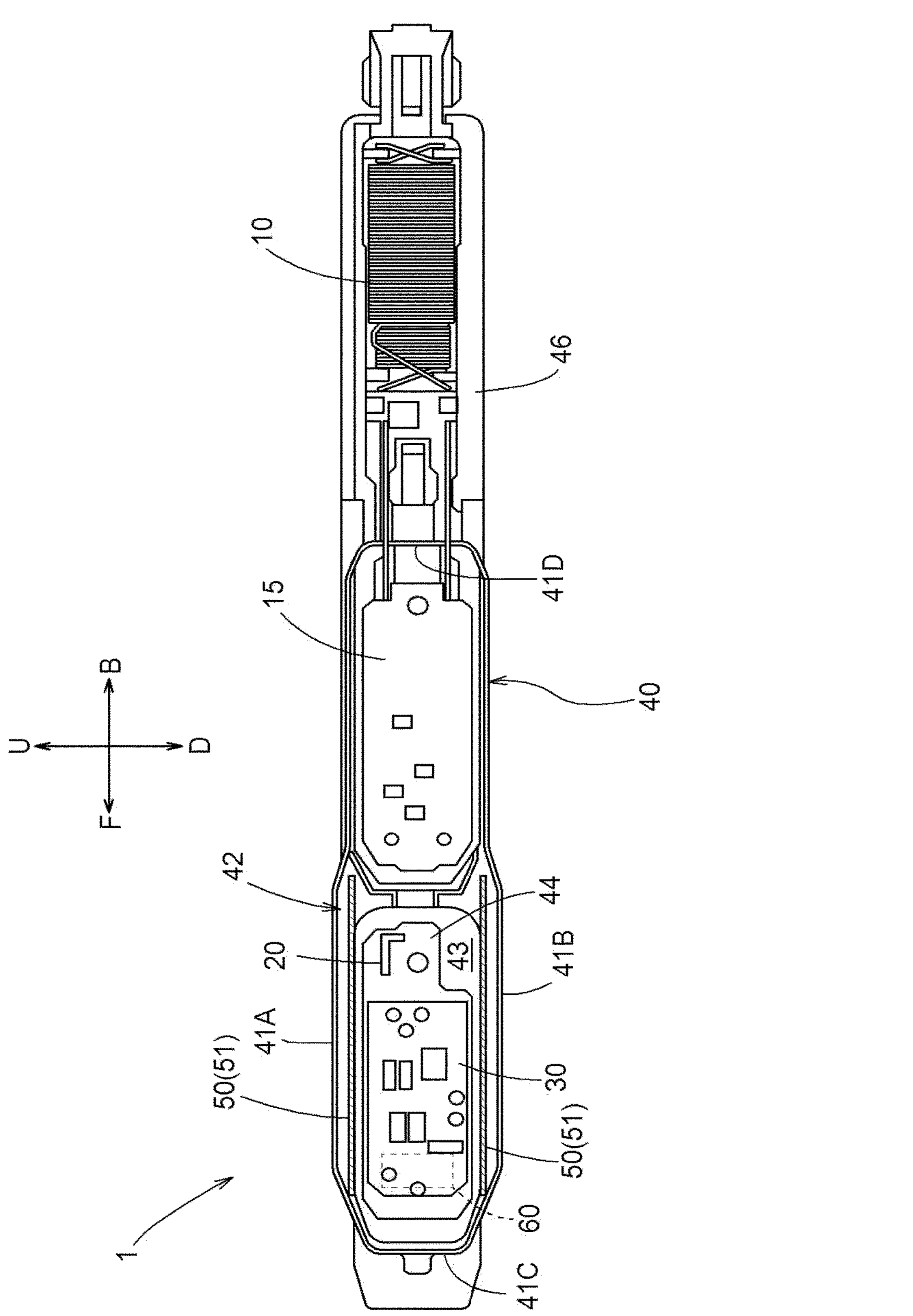
FIG. 2 is a plan view of the antenna device according to the first embodiment.

FIG. 1 is an exploded perspective view of a door handle 100 included in a vehicle and provided with the antenna device 1. FIG. 2 is a plan view of the antenna device 1. The door handle 100 is attached to an outer panel of a door that is attached to a getting-on-and-off entrance in a vehicle body.

Herein, in order to facilitate understanding, in the present embodiment, unless otherwise particularly specified, "front" (a direction of the arrow F illustrated in FIG. 1) means a front side in a front-back direction (traveling direction) of the vehicle, and "back" (a direction of the arrow B illustrated in FIG. 1) means a back side in the front-back direction (traveling direction) of the vehicle. A left-right direction or a lateral direction means a vehicle transverse direction (vehicle width direction) orthogonal to the front-back direction of the vehicle. Further, "up" (a direction of the arrow U illustrated in FIG. 1) and "down" (a direction of the arrow D illustrated in FIG. 1) represent a positional relation in a vertical direction (perpendicular direction) of the vehicle, i.e., a relation in an above-ground height. Further, "left" (a direction of the arrow L in FIG. 1) indicates a left side of the vehicle, and "right" (a direction of the arrow R in FIG. 1) indicates a right side of the vehicle.

FIG. 1 illustrates, as a cited example, the door handle 100 attached to the door panel of the left door of the vehicle. As illustrated in FIG. 1, the door handle 100 is provided in such a way that a longitudinal direction of the door handle 100 is along the front-back direction of the vehicle. The door handle 100 is configured in such a way as to include a body portion 101 and a cover portion 102, and the antenna device 1 is accommodated in a space formed by the body portion 101 and the cover portion 102. Accordingly, the antenna device 1 is provided inside the door handle 100 of the vehicle.

The body portion 101 is integrally formed of resin, and is provided in such a way as to extend along the front-back direction of the vehicle. The body portion 101 forms an accommodation portion 101D inside. The body portion 101 includes an upper wall portion 101A, a lower wall portion 101B, and a back wall portion 101C that surround the accommodation portion 101D. The body portion 101 includes a front end portion provided with a cylindrical portion 101F that includes a penetration hole 101E penetrating through the cylindrical portion 101F along the vehicle width direction.

The cover portion 102 is integrally formed of resin. The cover portion 102 covers the antenna device 1 accommodated in the body portion 101. At this time, an engagement portion (not illustrated) provided at the cover portion 102 engages with an engaged portion 101G provided at the body portion 101, and thereby, the cover portion 102 is fixed to the body portion 101. The cover portion 102 includes a front fixed portion 102A and a back fixed portion 102B that protrude toward a door-panel side (a right side of the vehicle), and each of the front fixed portion 102A and the back fixed portion 102B is attached to the door panel in a state of entering an inside of the door panel through a hole portion formed in the door panel of the left door of the vehicle.

As illustrated in FIG. 1 and FIG. 2, the antenna device 1 includes a first antenna 10, a transmission-reception unit 15, a second antenna 20, a communication unit (one example of "receiver") 30, an inner case 40, and electrodes 50.

The first antenna 10 is provided at a grip portion 100A of the door handle 100. The grip portion 100A of the door handle 100 is a part included in the door handle 100 and gripped at the time of opening and closing the door.

The first antenna 10 transmits and receives a radio wave in a first frequency band. In the present embodiment, the first antenna 10 is used for transmitting and receiving a radio wave for performing wireless communication with a key device (a wireless key terminal associated with the vehicle in advance) that is carried by a person to get on the vehicle. In the present embodiment, the first frequency band corresponds to what is called a low frequency (LF) band (frequencies of 30 KHz to 300 kHz) suitable for long distance communication. In the present embodiment, the first antenna 10 is formed into a coil shape. An unillustrated capacitor is connected in series to the first antenna 10, and is configured in such a way as to resonate in series. Thereby, a radio wave can be transmitted and received.

The transmission-reception unit 15 performs communication in the above-described LF band by the first antenna 10. Specifically, reception of a request signal related to locking or unlocking of the door, and transmission of a response request signal concerning a response to this request signal are performed by wireless communication using radio waves in the LF band.

Herein, when the key device receives the response request signal from the first antenna 10, the key device transmits information including an ID unique to the vehicle. This information is transmitted by using a radio wave in a second frequency band higher than the first frequency band.

The second antenna 20 transmits and receives a radio wave in the second frequency band higher than the first frequency band. In the present embodiment, the second antenna 20 is used for transmitting and receiving a radio wave for performing wireless communication with a portable terminal (e.g., a smartphone) carried by the person to get on the vehicle. In the present embodiment, the second frequency band corresponds to a band (frequencies of 2402 MHz to 2480 MHz) used in Bluetooth (registered trademark). The second antenna 20 receives the information including the unique ID transmitted from the key device.

The communication unit 30 processes a signal based on a radio wave received by the second antenna 20. The communication unit 30 acquires the information including the unique ID received by the second antenna 20. When the communication unit 30 determines, based on the communicated information, that the door is allowed to be unlocked, the communication unit 30 waits to receive an unlocking command from the below-described electrostatic capacitance sensor 51, or when the communication unit 30 determines, based on the communicated information, that the door is not allowed to be unlocked, the communication unit 30 remains on standby.

The inner case 40 is integrally formed of resin. The inner case 40 accommodates the second antenna 20 and the communication unit 30 inside the door handle 100. The inner case 40 includes a container-shaped portion 42. The inner case 40 includes an upper wall portion 41A, a lower wall portion 41B, a front wall portion 41C, and a back wall portion 41D that surround the container-shaped portion 42. An accommodation portion 43 in which the second antenna 20 and the communication unit 30 are accommodated is formed inside the container-shaped portion 42. In the present embodiment, the above-described communication unit 30 and second antenna 20 are mounted on a single board 44, and the board 44 is supported inside the accommodation portion 43. Thus, wire arrangement between the communication unit 30 and the second antenna 20 can be performed through a pattern of the board. Accordingly, for example, a harness does not need to be used for connecting the communication unit 30 and the second antenna 20 to each other, and thus, the configuration can be simplified.

The inner case 40 includes, on a front side, an insertion portion 45 inserted into the penetration hole 101E of the body portion 101. A harness via which the transmission-reception unit 15 and the communication unit 30 are electrically connected to a door lock control unit (not illustrated) is inserted into the insertion portion 45. The inner case 40 includes, on a back side, a support plate 46 that supports the above-described first antenna 10. In the inner case 40, the container-shaped portion 42, the insertion portion 45, and the support plate 46 are integrally formed of resin. Accordingly, the inner case 40 in the present embodiment includes not only the container-shaped portion 42 that accommodates the second antenna 20, the communication unit 30, and the transmission-reception unit 15, but also the insertion portion 45 and the support plate 46. The inner case 40 including the container-shaped portion 42, the insertion portion 45, and the support plate 46 is integrally accommodated in the accommodation portion 101D of the body portion 101.

In the inner case 40, the first antenna 10 and the second antenna 20 are arranged along the longitudinal direction of the door handle 100. The longitudinal direction of the door handle 100 is a direction in the door handle 100 and along the front-back direction of the vehicle. In the present embodiment, the second antenna 20 is accommodated in the container-shaped portion 42 of the inner case 40, and the first antenna 10 is supported by the support plate 46 of the inner case 40. Accordingly, the first antenna 10 is arranged on a back side in the inner case 40, and the second antenna 20 is arranged on a front side in the inner case 40.

Each of the first antenna 10 and the second antenna 20 is supplied with electric power by an electric power supply unit (not illustrated) via a connection portion 60. The connection portion 60 is electrically connected to the harness inserted into the above-described insertion portion 45. The harness is electrically connected to the door lock control unit. Electric power from the electric power supply unit and a signal are supplied and transmitted to the antenna device 1 via the harness and the connection portion 60 from the door lock control unit. In other words, the connection portion 60 is electrically connected to the transmission-reception unit 15 via one or both of a cable and the pattern formed in the board, for example, and electric power is supplied to the first antenna 10 from the electric power supply unit via the transmission-reception unit 15. The connection portion 60 is electrically connected to the communication unit 30 via one or both of a cable and the pattern formed in the board, for example, and electric power is supplied to the second antenna 20 from the electric power supply unit via the communication unit 30. The connection portion 60 may be a connector connected to the harness, or may be a land provided in the board, for example.

The second antenna 20 is provided on a side of the electric power supply unit. The term "provided on a side of the electric power supply unit" means that the electric power supply unit, the second antenna 20, and the first antenna 10 are arranged in this order from a front side in the front-back direction in a plan view of the door handle 100.

The electrode 50 is used as an electrode of the electrostatic capacitance sensor 51, and is provided inside the door handle 100. When a person to get on the vehicle grips the door handle 100 or approaches the electrode 50 (or presses the electrode 50), capacitance thereof changes from that in a state where the person to get on the vehicle does not grip the door handle 100 or in a state where the person to get on the vehicle is not close to the electrode 50. The electrostatic capacitance sensor 51 outputs a signal depending on a change in capacitance. Thereby, whether the person to get on the vehicle grips the door handle 100 or whether the person to get on the vehicle approaches the electrode 50 can be detected.

The electrodes 50 are provided on side walls that are included in the inner case 40 and that are on lateral sides of the first antenna 10 and the second antenna 20. The side walls that are on lateral sides of the first antenna 10 and the second antenna 20 correspond to wall portions provided on upper and lower sides in the inner case 40. In the present embodiment, the inner case 40 includes the container-shaped portion 42, the insertion portion 45, and the support plate 46. The insertion portion 45 is inserted into the door panel, and the support plate 46 is formed into a flat plate shape. Accordingly, in the present embodiment, the side walls on lateral sides of the first antenna 10 and the second antenna 20 correspond to the upper wall portion 41A and the lower wall portion 41B in the container-shaped portion 42.

Herein, the upper wall portion 41A and the lower wall portion 41B are provided in a state of standing along the vehicle width direction. Meanwhile, the electrode 50 is constituted by a metal plate. In the present embodiment, the electrodes 50 are provided in a state of standing along the vehicle width direction in such a way as to face the upper wall portion 41A and the lower wall portion 41B. A thickness of the electrode 50 is extremely thin as compared with a size (a length along the front-back direction and a length along the up-down direction) of the electrode 50 in a plan view, and thus, a mounting space for the electrode 50 can be easily secured.

Although, in the present embodiment, the electrode 50 is accommodated in the accommodation portion 43 in the container-shaped portion 42, the electrode 50 may be provided outside the container-shaped portion 42, i.e., between the container-shaped portion 42 and the body portion 101, or when the inner case 40 is integrally formed, the electrode 50 may be configured by insert molding in such a way as to be included in the upper wall portion 41A and the lower wall portion 41B of the container-shaped portion 42.

When the electrostatic capacitance sensor 51 detects proximity of a person to get on the vehicle via the electrodes 50, the electrostatic capacitance sensor 51 communicates a locking command or an unlocking command to the door lock control unit. The electrostatic capacitance sensor 51 preferably includes a locking electrode and an unlocking electrode as the electrodes 50. Thereby, when the locking electrode detects proximity of the person to get on the vehicle, the door lock control unit allows the door to be locked, and when the unlocking electrode detects proximity of the person to get on the vehicle, the door lock control unit allows the door to be unlocked.

Second Embodiment

Next, a second embodiment of the antenna device 1 is described. While the description is made above on the first embodiment in which the electrodes 50 of the electrostatic capacitance sensor 51 are provided on the side walls that are included in the inner case 40 and that are on lateral sides of the first antenna 10 and the second antenna 20, the second embodiment differs in that the electrode 50 of the electrostatic capacitance sensor 51 is provided in such a way as to face the door of the vehicle, and a part included in the electrode 50 and facing the second antenna 20 is cut out. The other configurations are similar to those in the above-described first embodiment, and thus, the following mainly describes the difference points.

Figure 3:
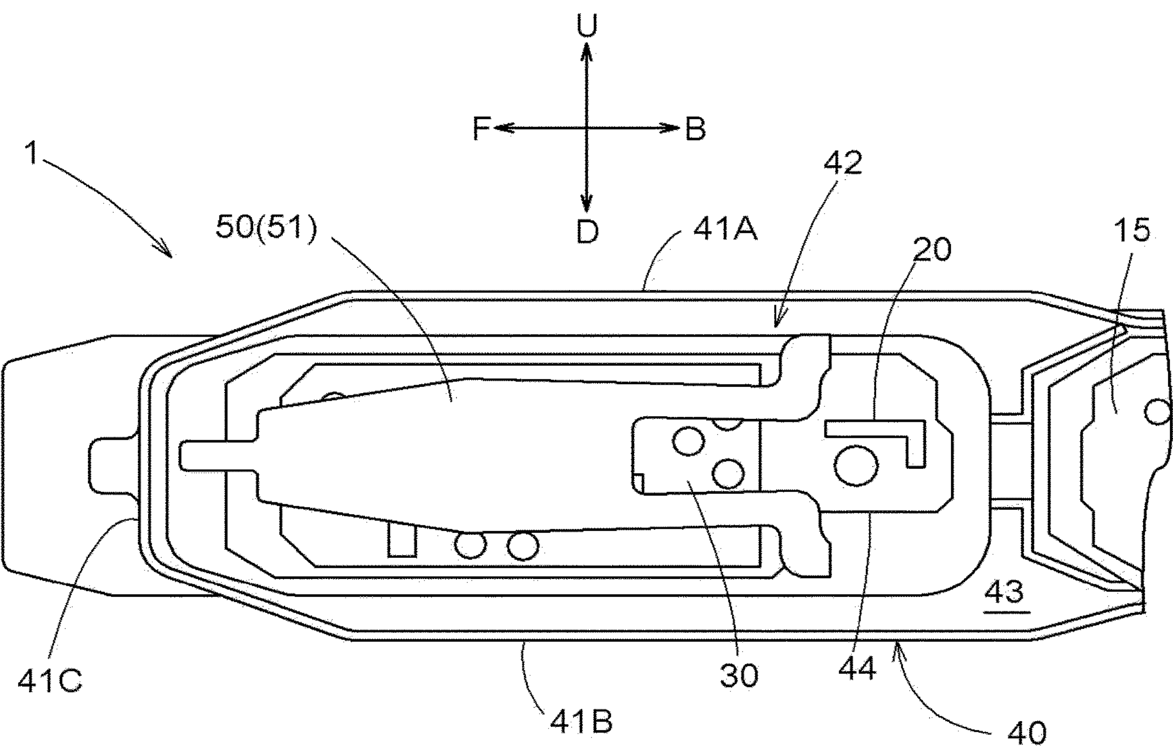
FIG. 3 is an enlarged view of a front-side portion of an antenna device according to a second embodiment.

FIG. 3 is an enlarged view of a front-side portion of the antenna device 1 according to the second embodiment. Also in the present embodiment, the electrode 50 of the electrostatic capacitance sensor 51 is provided inside the door handle 100. In the present embodiment, the electrode 50 is provided in such a way as to face the door of the vehicle. The electrode 50 is constituted by a metal plate, similarly to the first embodiment. Accordingly, the electrode 50 is provided in such a way that a surface of this plate faces the door.

The electrode 50 is provided at the outermost surface that is included in the antenna device 1 and that is at a part of the door handle 100 gripped by a person to get on the vehicle, in such a way that the electrode 50 overlaps with the communication unit 30 in a plan view as illustrated in FIG. 3.

Herein, the second antenna 20 is provided on a back side of the communication unit 30. Meanwhile, the electrode 50 is constituted by a metal plate as described above. Covering the second antenna 20 with metal causes an antenna quality of the second antenna 20 to be deteriorated. In view of it, the electrode 50 includes the cut-out portion facing the second antenna 20 and having a rectangular shape. Thereby, as illustrated in FIG. 3, the second antenna 20 is prevented from being covered with metal, and deterioration of the antenna quality can be prevented.

[Antenna Quality of Second Antenna]

Figure 4:
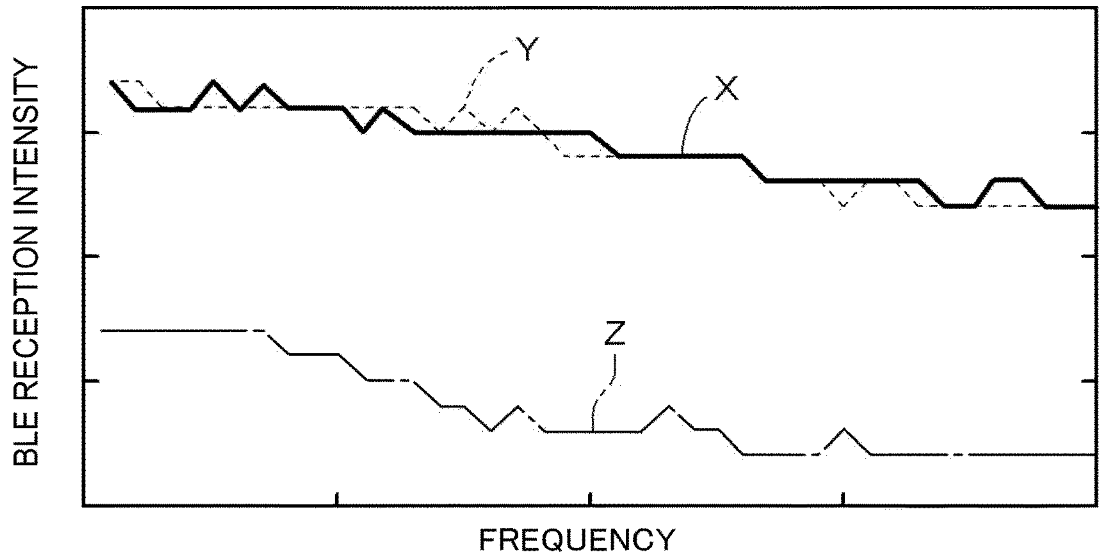
FIG. 4 is a diagram representing a reception intensity of a second antenna.

Next, an antenna quality of the second antenna 20 is described. FIG. 4 illustrates one example of an antenna quality of the second antenna 20. In FIG. 4, the vertical axis indicates a reception intensity of the second antenna 20, and the horizontal axis indicates a frequency.

In FIG. 4, the solid line indicates an antenna quality of the second antenna 20 in a case (hereinafter, referred to as "configuration X") where the electrode 50 is arranged on a lateral side of the second antenna 20 as in the first embodiment or where a part included in the electrode 50 and facing the second antenna 20 is cut out as in the second embodiment. For reference, the broken line indicates an antenna quality of the second antenna 20 in a case (hereinafter, referred to as "configuration Y") where the electrode 50 is not provided, and the one-dot chain line indicates an antenna quality of the second antenna 20 in a case (hereinafter, referred to as "configuration Z") where the electrode 50 is provided in such a way as to overlap with the communication unit 30 in a plan view, and a part included in the electrode 50 and facing the second antenna 20 is not cut out.

As illustrated in FIG. 4, adopting the configuration X enables a reception intensity to be improved as compared with the configuration Z. Even in the case of the configuration X, a reception intensity similar to that in the configuration Y can be achieved. Thus, the present antenna device 1 enables a configuration that prevents an antenna quality of the second antenna 20 from being deteriorated.

Other Embodiments

In the above-described embodiment, the first antenna 10 is supported by the support plate 46 of the inner case 40. However, the first antenna 10 can be also configured in such a way as to be accommodated in the accommodation portion 43 of the container-shaped portion 42 of the inner case 40.

In the above-described embodiment, each of the first antenna 10 and the second antenna 20 is supplied with electric power by the electric power supply unit via the connection portion 60, and the second antenna is provided on a side of the electric power supply unit. However, the first antenna 10 and the second antenna 20 can be configured to be supplied with electric power from connection portions different from each other. The second antenna 20 does not need to be provided on a side of the electric power supply unit. In other words, in a plan view of the door handle 100, the electric power supply unit, the first antenna 10, and the second antenna 20 may be arranged in this order from a front side in the front-rear direction.

In the above-described first embodiment, the electrodes 50 of the electrostatic capacitance sensor 51 are provided at the side walls that are included in the inner case 40 and that are on lateral sides of the first antenna 10 and the second antenna 20. However, the electrostatic capacitance sensor 51 can be provided at the front wall portion of the inner case 40, or can be provided at the back wall portion.

In the above-described second embodiment, the electrode 50 of the electrostatic capacitance sensor 51 is arranged in a state of overlapping with the communication unit 30 in a plan view. However, the electrode 50 can be arranged in such a way as to overlap with the transmission-reception unit 15.

In the above-described second embodiment, the electrode 50 of the electrostatic capacitance sensor 51 is provided at the outermost surface of the antenna device 1. However, the electrode 50 of the electrostatic capacitance sensor 51 can be provided on a back-surface side, i.e., on a door-panel side in the antenna device 1.

This disclosure can be used as an antenna device provided inside a door handle of a vehicle.

An antenna device according to an aspect of this disclosure includes a first antenna, a second antenna, a receiver, and an inner case. The first antenna is provided at a grip portion of a door handle and transmits a radio wave in a first frequency band. The second antenna receives a radio wave in a second frequency band higher than the first frequency band. The receiver processes a signal based on the radio wave received by the second antenna. The inner case accommodates the second antenna and the receiver inside the door handle. In the inner case, the first antenna and the second antenna are arranged along a longitudinal direction of the door handle.

With such a feature configuration, the first antenna and the second antenna are provided along the longitudinal direction of the door handle, and thus, can be separated from each other by a certain distance. Accordingly, sensitivity of each of the first antenna and the second antenna can be prevented from declining. A cable for connecting the second antenna and the receiver to each other can be reduced, for example, by mounting the second antenna and the receiver on a single board. Accordingly, a smaller size and easiness of wire arrangement can be achieved.

Each of the first antenna and the second antenna may be supplied with electric power by an electric power supply unit via a connection portion. The second antenna may be provided on a side of the electric power supply unit.

With such a configuration, a common connection portion can be used for supplying electric power to the first antenna and the second antenna, and thus, a smaller size can be achieved. Since the second antenna is provided on a side of the electric power supply unit, wire arrangement for connecting the second antenna and the electric power supply unit to each other can be simplified.

An electrode of an electrostatic capacitance sensor may be provided inside the door handle. The electrode may be provided at a side wall in the inner case and on a lateral side of the first antenna and the second antenna.

With such a configuration, the electrode of the electrostatic capacitance sensor and the second antenna can be arranged without overlapping with each other in a plan view of the door handle. Accordingly, the electrode of the electrostatic capacitance sensor does not influence an antenna quality of the second antenna, and thus, the antenna quality of the second antenna can be prevented from deteriorating.

Alternatively, an electrode of an electrostatic capacitance sensor may be provided inside the door handle, and the electrode may be provided in such a way as to face a door of the vehicle. A part included in the electrode and facing the second antenna may be cut out.

Even with such a configuration, the electrode of the electrostatic capacitance sensor and the second antenna can be arranged without overlapping with each other in a plan view of the door handle. Accordingly, the electrode of the electrostatic capacitance sensor does not influence an antenna quality of the second antenna, and thus, the antenna quality of the second antenna can be prevented from deteriorating.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An antenna device being provided inside a door handle of a vehicle, the antenna device comprising:

- a main body that extends in a longitudinal direction of the door handle;

a first antenna that is provided at a grip portion of the door handle, and transmits a radio wave in a first frequency band;

a second antenna that receives a radio wave in a second frequency band higher than the first frequency band;

a receiver that processes a signal based on the radio wave received by the second antenna; and an inner case accommodated in the main body, the inner case including a container-shaped portion and a support plate, the container-shaped portion accommodates the second antenna and the receiver inside the door handle and the first antenna is supported on the support plate, wherein, in the inner case, the first antenna and the second antenna are arranged along the longitudinal direction of the door handle, the inner case includes a plurality of walls extending in a lateral direction of the door handle that completely surround and define the container-shaped portion, the plurality of walls include an upper wall portion, a lower wall portion, a front wall portion, and a back wall portion that surround the container-shaped portion, the upper wall portion and the lower wall portion face each other, the front wall portion and the back wall portion face each other, and the support plate extends rearward from the back wall portion.

2. The antenna device according to claim 1, wherein each of the first antenna and the second antenna is supplied with electric power by an electric power supply unit via a connection portion, and the second antenna is provided on a side of the electric power supply unit.

3. The antenna device according to claim 1, wherein an electrode of an electrostatic capacitance sensor is provided inside the door handle, and the electrode is provided on at least one of the upper wall portion or the lower wall portion and on a lateral side of the first antenna and the second antenna.

4. The antenna device according to claim 2, wherein an electrode of an electrostatic capacitance sensor is provided inside the door handle, and the electrode is provided on at least one of the upper wall portion or the lower wall portion and on a lateral side of the first antenna and the second antenna.

5. The antenna device according to claim 1, wherein an electrode of an electrostatic capacitance sensor is provided inside the door handle, and the electrode is provided in such a way as to face a door of the vehicle, and a part included in the electrode and facing the second antenna is cut out.

6. The antenna device according to claim 2, wherein an electrode of an electrostatic capacitance sensor is provided inside the door handle, and the electrode is provided in such a way as to face a door of the vehicle, and a part included in the electrode and facing the second antenna is cut out.

7. The antenna device according to claim 1, wherein the receiver is arranged at a first end of the container-shaped portion and the support plate extends from a second end of the container-shaped portion opposite to the first end.

* * * * *